United States Patent [19]
Frommelt et al.

[11] 3,875,954
[45] Apr. 8, 1975

[54] LOADING DOCK SEALS

[75] Inventors: Cyril P. Frommelt; Sylvan J. Frommelt, both of Dubuque, Iowa

[73] Assignee: Dubuque Awning & Tent Company, Dubuque, Iowa

[22] Filed: Jan. 28, 1974

[21] Appl. No.: 437,013

[52] U.S. Cl.......... 135/5 A; 52/173 DS; 24/255 TZ; 24/81 BF
[51] Int. Cl............................................. E06b 7/22
[58] Field of Search............. 24/81 BF, 255 TZ; 52/173 DS, 288; 135/5 A; 223/91, 93, 96; 211/89; 49/383; 292/256, 258

[56] References Cited
UNITED STATES PATENTS

| | | | |
|---|---|---|---|
| 2,491,524 | 12/1949 | Siple | 24/207 |
| 3,683,572 | 8/1972 | Alten | 52/173 |
| 3,741,593 | 6/1973 | Toti | 52/288 |

*Primary Examiner*—Werner H. Schroeder
*Assistant Examiner*—Conrad L. Berman
*Attorney, Agent, or Firm*—Root & O'Keeffe

[57] ABSTRACT

Seals for mounting on the rear edge portions of the sides of trucks backed into loading dock shelters of the wrap-around type or drape type for closing the opening between the open door panels of the truck and the adjacent side walls thereof, the seals embodying elongated side walls flaring outwardly from each other in a transverse direction for yieldingly engaging such door panels and adjacent side walls therebetween.

10 Claims, 6 Drawing Figures

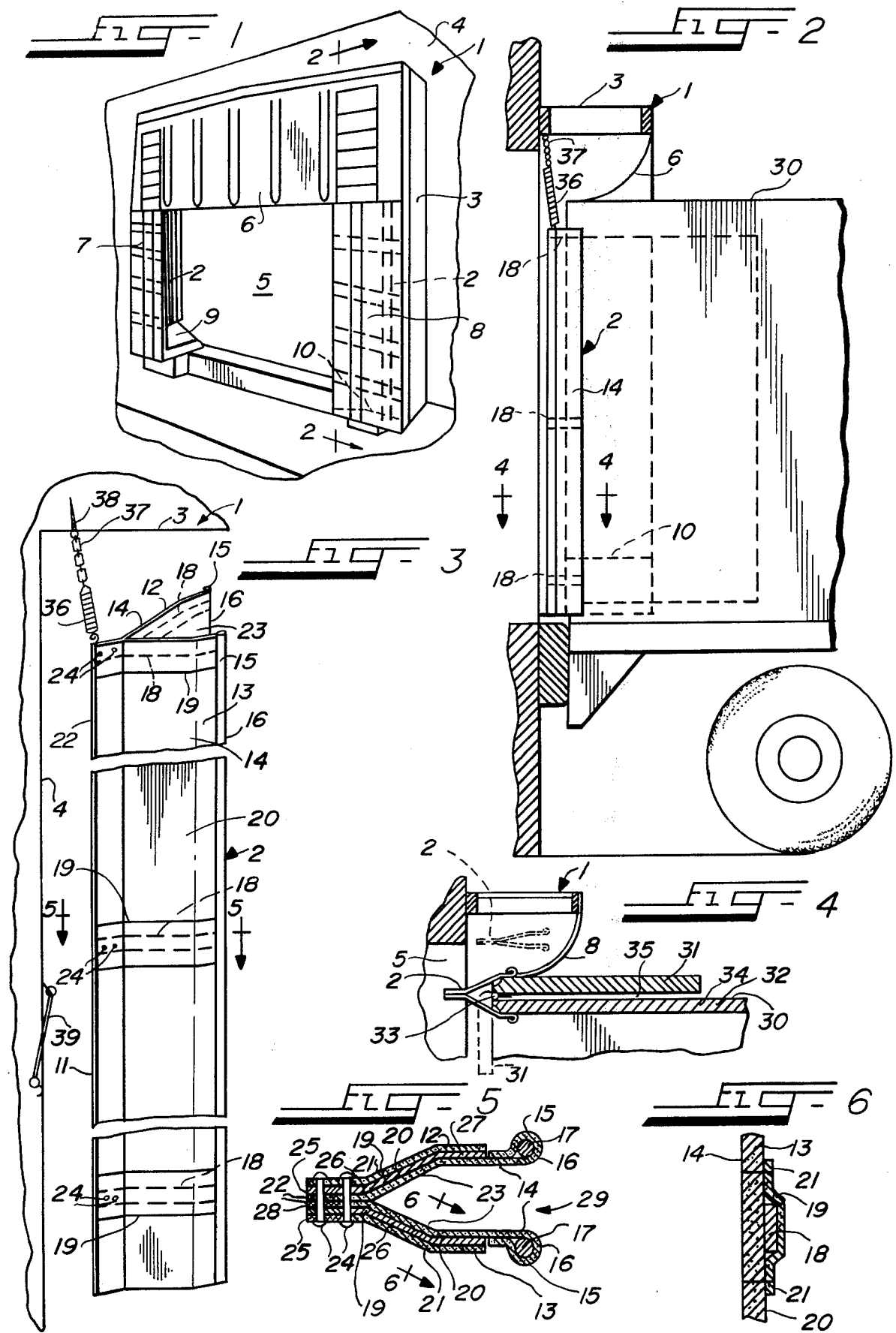

LOADING DOCK SEALS

BACKGROUND OF INVENTION

This invention relates to seals, and, more particularly, to seals which are particularly well adapted for use with truck dock shelters, and the like.

It is a primary object of the present invention to afford a novel seal.

Another object of the present invention is to afford a novel seal which is particularly well adapted for use as an integral part of a truck dock shelter.

Another object of the present invention is to afford a novel seal for use with truck dock shelters of the "wrap-around" type or "drape" type, that is, shelters which embody walls and curtains which consist of fabric or sheet material supported in more or less a tent-like or drape-like manner, as distinguished from fabric or sheet material affording the casing of a pad or pillow, or the like.

Loading dock shelters of the aforementioned wrap-around type or drape type have included shelters of the retractable type, such as, for example, loading dock shelters of the type shown in our U.S. Pat. Nos. 2,892,463 and 3,352,314.

Loading dock shelters of the types shown in both of the aforementioned patents may be said to be shelters which embody yieldable frames around the doorway of a warehouse on which they are mounted. Both of them afford effective, automatic sealing engagement between the shelters and the trucks operatively engaged therewith.

In addition, loading dock shelters of the type embodying rigid frames, with cover members disposed in operative position thereon to be yieldably held in sealing engagement with the tops and sides of trucks operatively engaged therewith, such as, for example, loading dock shelters of the type shown in our U.S. Pat. No. 3,403,489, and in our co-pending application for U.S. Letters Patent, Ser. No. 285,052, filed Aug. 30, 1972, have also been known in the art. These latter loading dock shelters also have been highly successful and afford effective, automatic sealing engagement between the shelters and the trucks operatively engaged therewith.

It is an important object of the present invention to afford a novel seal for trucks, which is particularly well adapted for use as an integral part of truck dock shelters of the aforementioned wrap-around or drape type.

In the operation of wrap-around or drape type loading dock shelters heretofore known in the art, when a truck backs into normal, operative sealing engagement therewith, the head curtain is engaged primarily with the top of the roof of the truck, and the side curtains commonly are engaged primarily with the outer side surfaces on the sides of the trucks. In such trucks, embodying rear doors, door panels commonly are hinged at one or both sides of the rear end of the truck body. When these door panels are disposed in closed position, they extend transversely across the rear end of the truck. When they are disposed in open position, they commonly are disposed outwardly of the sides of the truck in substantially parallel relation thereto. Commonly, this is a spaced, parallel relation, and, because of the hinges on the door panels, the space between the door panels and the adjacent sides of the truck can be of a substantial width, not uncommonly being in the nature of three or four inches.

When the side curtains of such a shelter are disposed in engagement with the outer surfaces at the respective sides of the truck, and when those outer surfaces are the side faces of doors disposed in parallel relation to the adjacent sides of the body of the truck, the spaces between the doors and the adjacent side walls of the truck body afford passageways therebetween for the passage of air therethrough. When these spaces are in the nature of the aforementioned three or four inches, substantial amounts of air may pass or "leak" between the side curtains of such a shelter and a truck disposed in operative position therein. On warm days, when the warehouse is air conditioned, this can result in a substantial cooling loss, and on cold days, when the warehouse is heated, such passage of air can result in substantial heat loss. In addition, such passage of air can result in substantial discomfort to personnel working near the warehouse doorway, particularly when the wind is blowing. It is an important object of the present invention to afford a novel seal for protecting against such passage of air.

Another object of the present invention is to afford a novel seal which may be quickly and easily mounted on a truck for closing the gap between such a door and the adjacent side wall of the truck in a novel and expeditious manner.

An object ancillary to the foregoing is to afford a novel seal of the aforementioned type which may be quickly and easily removed from such a truck, when the latter is to be moved away from the loading dock shelter in which the seal is being used.

Yet another object of the present invention is to afford a novel seal for use in truck dock shelters, and the like, which is practical and efficient in operation and which may be readily and economically produced commercially.

Other and further objects of the present invention will be apparent from the following description and claims and are illustrated in the accompanying drawings, which, by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

In the drawings:

FIG. 1 is a perspective view of a loading dock shelter, which includes seals embodying the principles of the present invention;

FIG. 2 is a longitudinal section view taken substantially along the line 2—2 in FIG. 1, and somewhat diagramatically, showing a truck disposed in operative position in the loading dock shelter, with a seal embodying the principles of the present invention, mounted on the truck;

FIG. 3 is an enlarged, fragmentary, sectional view similar to FIG. 2 but without the truck disposed in the loading dock shelter;

FIG. 4 is a fragmentary, detail sectional view taken substantially along the line 4—4 in FIG. 2;

FIG. 5 is a fragmentary, detail sectional view taken substantially along the line 5—5 in FIG. 3; and FIG. 6 is a fragmentary, detail sectional view taken substantially along the line 6—6 in FIG. 5.

DESCRIPTION OF THE EMBODIMENT SHOWN HEREIN

A loading dock shelter 1, which includes two seals 2, embodying the principles of the present invention, is shown in the drawings to illustrate the preferred embodiment of the present invention.

The loading dock shelter 1 is of the wrap-around type or drape type shown in our aforementioned co-pending application, Ser. No. 285,052, now U.S. Pat. No. 3,792,559 and embodies, in general, a supporting frame 3 operatively mounted on a warehouse wall 4 in surrounding relation to the top and lateral sides of a warehouse door 5, with a head curtain 6 and side curtains 7 and 8 mounted on and supported by the edge of the frame 3 remote from the warehouse wall 4, FIG. 1. Resilient pads 9 and 10 are disposed at the lower ends of each side of the loading dock shelter 1 in the manner shown in greater detail in the aforementioned application, Ser. No. 285,052.

As will be appreciated by those skilled in the art, the loading dock shelter 1, embodying a stationary supporting frame 3 is shown in the drawings merely by way of illustration, and not by way of limitation, and loading dock shelters embodying retractable supporting frames, such as, for example, loading dock shelters of the type shown in the aforementioned U.S. Pat. Nos. 2,892,463 and 3,352,314, may be used without departing from the purview of the broader aspects of the present invention.

The seals 2 are identical in construction and operation, and each embodies an elongated body portion 11 having two elongated side walls 12 and 13, FIG. 3. The side walls 12 and 13 are identical in construction except that they are mirror images of each other. Each embodies an elongated flexible panel 14, which may be made of any suitable material, but preferably is made of a water-repellent, wear-resistant fabric, such as, for example, canvas duck or rubber-impregnated nylon fabric. A hem 15, which extends the length of each of the panels 12 and 13, is formed in one longitudinal edge portion 16 of the respective panels 12 and 13, FIGS. 3 and 5. Each of the hems 15 has a reinforcing member 17, FIG. 5, which may be of any suitable type, such as, for example, an elongated rod or pipe, mounted therein.

Three clamping members 18 are mounted in spaced relation to each other on each of the panel members 14, FIG. 3. One of the clamping members 18 is mounted at the top edge of the respective panel 14; another clamping member 18 is mounted on the central portion of the respective panel 14; and the third clamping member 18 is mounted on the respective panel 14 in upwardly spaced relation to the lower edge thereof, for a purpose which will be discussed in greater detail presently. The clamping members 18 are in the form of elongated rods or strips, which are rectangular in transverse cross section, and may be made of any suitable resilient material, but, preferably, are made from spring steel.

The clamping members 18 are mounted in pockets formed by elongated strips 19 of suitable fabric, such as, for example, the aforementioned canvas duck or rubber-impregnated nylon fabric, secured to one face 20 of the respective panel members 12 and 13 by suitable means, such as stitching 21, FIG. 6. The strips 19 extend transversely across the respective panel members 12 and 13 from the hem 15 thereon, and terminate at their other ends at the longitudinal edge portions 22 of the respective panels 12 and 13, remote from the longitudinal edge portions 16 thereof. The elongated strips 19 are of such length that they extend the full width of each of the panels 12 and 13 between the longitudinal edges 22 and the hems 15 on the longitudinal edge portions 16 thereof.

In the assembled seal 2, the side walls 12 and 13 are secured together along the longitudinal edge portions 22 with the faces 23 of the panels 14, remote from the faces 20 thereof, disposed in facing relation to each other. The longitudinal edge portions 22 may be secured together in any suitable manner, but, preferably are secured by suitable fastening members, such as, for example, hollow rivets 24, FIGS. 3 and 5, extending through the edge portions 22 and the adjacent end portions of the clamping members 18.

The end portions 25 of the clamping members 18, through which the fastening members 24 extend, are substantially flat and are disposed in substantially parallel relation to each other. Each of the clamping members 18 includes an intermediate portion 26, which extends outwardly at an acute angle to the plane of the attached end portion 25, and an outer end portion 27, which extends from the other end of the intermediate portion 26 in a plane substantially parallel to the plane of the end portion 25, FIG. 5.

With this construction, the assembled seals 2 are somewhat Y-shaped in transverse cross section, having a closed side 28 on the side thereof corresponding to the longitudinal edge portions 22 of the panels 14, and flaring outwardly to an open side 29 at the side remote from the closed side 28, FIG. 5.

In the operation of wrap-around or drape type truck dock shelters, such as the shelter 1, when a truck is backed into normal operative position relative thereto, the head curtains and side curtains of the shelter commonly rest against the top and adjacent sides of the rear end portion of the truck body, in the manner of the head curtain 6 and the side curtain 8, as shown in FIGS. 2 and 4, relative to a truck 30. It will be remembered that such trucks commonly have door panels, such as the door panels 31, hingedly connected to the body 32 of the truck 30 by suitably hinges 33 for swinging movement between a closed position wherein the door panels 31 extend laterally across the rear end of the truck body 32, as shown in broken lines in FIG. 4, and an open position wherein they are disposed in outwardly spaced, substantially parallel to the adjacent side wall 34 of the truck body 32. In such open position, a gap, such as the gap 35 shown in FIG. 4, is commonly left between the door panel 31 and the adjacent side wall 34, and, in many instances, this gap is of substantial width, such as, for example, the aforementioned three or four inches.

As is illustrated in FIGS. 2 and 4, although the engagement of the truck 30 with the curtains 6 and 8 of the loading dock shelter 1 is such that an effective seal is afforded between the curtains 6 and 8 and the adjacent surfaces of the body 32 of the truck 30, the gap 35 affords a passageway between the side curtain 8 and the adjacent side 34 of the truck 30 for the passage of air into and out of the warehouse door 5. Inasmuch as the door panels on such trucks normally are of substantial height, such passage of air can be responsible for a substantial heat loss during the cold weather, and a substantial cooling loss during warm weather. In addition, of course, such passage of air can cause substantial discomfort to the personnel working in or near the doorway 5, particularly in the colder weather when cold drafts can emianate from the gaps thus afforded at each side of a truck being loaded or unloaded.

The present invention affords an effective, and novel structure for preventing such drafts. It will be remembered that one of the seals 2 is disposed at each side of the doorway 5 in the loading dock shelter 1. When the seals 2 are disposed in stored position, they may be disposed in upright position on the pads 9 and 10, adjacent to the respective sides of the frame 3, as illustrated in broken lines in FIG. 4. In the preferred embodiment of the present invention, each of the seals 2 is yieldingly secured to the frame 3 of the loading dock shelter 1 by suitable securing members, such as a tension coil spring 36 and a chain 37, FIG. 3. One end of the chain 37 may be connected to the top of the supporting frame 3 by suitable means, such as a screw 38, with the other end of the chain 37 connected to one end of the coil spring 36. The other end of the coil spring 36 is suitably connected to the respective seal 2, such as, for example, by hooking it into one of the hollow rivets 34, as shown in FIG. 3. The coil spring 36 and chain 37 serve two purposes. One purpose is to yieldingly hold the respective seal 2 in upright position in the loading dock shelter 1 when it is not in use and is being stored therein. The other purpose is to afford a retaining member for insuring against accidental or inadvertent removal of the respective seal 2 from the loading dock shelter 1. If desired, a suitable tie-back member 39, FIG. 3, of any suitable form, such as, for example, an elastic cord or a tension coil spring, may be secured to the warehouse wall 4, for assisting in releasably holding each respective seal 2 in stored position.

After a truck, such as the truck 30, has been backed into operative position with respect to the loading dock shelter 1, the seals 2 may be secured to the rear edge portions of the respective side walls of the truck body 32 in overlapping relation to the rear edge portion of the gap 35 as illustrated in solid lines in FIG. 4. This may be accomplished by manually opening the open side 29 of the respective seal 2 from its normal contracted position, shown in FIG. 5 and in broken lines in FIG. 4, to the expanded position shown in solid lines in FIG. 4, and mounting the seal 2 in enveloping relation to each adjacent side wall and door panel, as shown with respect to the side wall 34 and the door panel 31 in FIG. 4. In such position of the seals 2, the clamping members 18 are effective to yieldingly clamp therebetween the portions of the truck on which they are mounted to thus hold the seals in position on the truck 30. In such position, the seals are effective to afford an obstruction to the passage of air through the passageway 35 into and out of the warehouse door 5.

It will be remembered that the lowermost clamping member 18 on each of the panels 14 is disposed in upwardly spaced relation to the lower edge thereof, FIG. 3. This spacing may be any suitable distance but preferably is in the nature of ten to twelve inches. In addition, the reinforcing members 17, which, it will be remembered, are mounted in respective ones of the hems 15, extend downwardly from the upper edges of the panels 14 and terminate at their lower ends at the top of the respective lowermost clamping members 18.

With this construction the lowermost portions of the seals 2 constitute flexible, readily deformable members which are well adapted for fitting around obstructions at the bottom of a truck on which the seals are mounted. In addition, this flexible construction of the lowermost portions of the seals 2 affords height adjustability therefor, which adapts it for effective use with truck bodies of various heights.

When the truck on which the seals are mounted is to be moved from the loading dock shelter, the seals may be manually removed from the rear edge portion of the truck and again placed in stored position laterally outwardly of respective sides of the doorway 5. If the truck 30 should move away from the loading dock 1, prior to removal of the seals 2, therefrom, the chains 37 and the tension coil springs 36 are effective to strip the seals 2 from the rear edge portion of the truck 30.

From the foregoing it will be seen that the present invention affords a novel seal for use as an integral part of loading dock shelters.

Also, it will be seen that the present invention affords a novel seal for protecting personnel working on a loading dock from discomfort, as well as protecting warehouses, and the like, from cooling and heat losses.

Also, it will be seen that the present invention affords a novel loading dock shelter seal which is practical and efficient in operation, and which may be readily and economically produced commercially.

Thus, while we have illustrated and described the preferred embodiment of our invention, it is to be understood that this is capable of variation and modification, and we, therefore, do not wish to limit it to the precise details set forth, but desire to avail ourselves of such changes and alterations as fall within the purview of the following claims.

We claim:

1. A seal for use with trucks of the type having a body, which includes oppositely disposed upstanding side walls having rear edge portions, and door panels hingedly mounted on said rear edge portions and swingable thereon between a closed position wherein they extend laterally across the rear of said body, and an open position wherein they are disposed outwardly of respective ones of said side walls in substantially parallel relation thereto, said seal comprising
   a. an elongated body portion having
      1. a substantially closed longitudinal edge portion, and
      2. an oppositely disposed, open longitudinal edge portion, and
   b. means connected to said first mentioned longitudinal edge portion and extending toward said second mentioned longitudinal edge portion for biasing the latter toward closed position,
   c. said means being adapted to releasably hold said open longitudinal edge portion in enveloping relation to the rear junction of one of said door panels and the one of said side walls adjacent thereto when said door panel is disposed in said open position.

2. A seal as defined in claim 1, and in which
   a. said body portion comprises two elongated side walls having
      1. two longitudinal edge portions secured together in parallel, engaging relation to each other, 2. two other longitudinal edge portions disposed in parallel, spaced relation to each other, and
3. two intermediate portions flaring outwardly away from each other between respective ones of said first mentioned and second mentioned edge portions of said elongated side walls.

3. A seal as defined in claim 2, and in which
a. said means comprises resilient means mounted on said elongated side walls in position to yieldingly urge said other longitudinal edge portions toward each other.

4. A seal as defined in claim 2, and in which
a. said means comprises elongated resilient members
   1. mounted on each of said elongated side walls, and
   2. extending transversely thereacross in spaced relation to each other.

5. A seal as defined in claim 4, and in which
a. each of said resilient members on each of said elongated side walls
   1. has one end portion secured
      (a) on said first mentioned edge portion of a respective one of said elongated side walls, and
      (b) in closely adjacent, parallel relationship to said one end portion of a respective one of said resilient members on the other of said elongated side walls, and
   2. flares outwardly away from said last mentioned one resilient member from said side one end portion thereof.

6. A seal as defined in claim 5, and in which
a. said side walls comprise elongated panels of flexible fabric,
b. said panels have pockets thereon, and
c. said resilient members are mounted in respective ones of said pockets.

7. A seal as defined in claim 6, and in which
a. said resilient members comprise spring steel.

8. A seal as defined in claim 6, and in which
a. said panels have hems formed in the outer edge portion of said other longitudinal edge portions of said side walls, and
b. elongated stiffener members are mounted in each of said hems and extend the major portion of the length of said panels.

9. A seal as defined in claim 5, and in which
a. the lowermost one of said resilient members on each of said side walls is disposed in upwardly spaced relation to the lower edge portion of the respective side wall.

10. In a loading dock shelter having a supporting frame projecting outwardly from a wall of a warehouse, and side curtains and head curtains mounted on and suppoted by the side of said frame remote from said warehouse in position to engage the sides and top of a truck backed into operative position in said frame,
a. two seals disposed at opposite sides of said frame,
b. each of said seals comprising
   1. an elongated body portion having
      (a) a substantially closed longitudinal edge portion,
      (b) an open longitudinal edge portion movable between an expanded and contracted position, and
      (c) an intermediate portion flaring outwardly from said closed edge portion to said open edge portion, and
   2. resilient clamping means mounted on said body portion and yieldingly urging said open edge portion toward said contracted position,
c. said open longitudinal edge portion being movable into said expanded position for receiving a rear edge portion of such a truck therein, and
d. said clamping means being disposed in position to yieldingly clamp said rear edge portion of such a truck in said open longitudinal edge portion when said rear edge portion of said truck is so disposed in said open longitudinal edge portion.

* * * * *